March 13, 1951     W. E. STITZ     2,545,054
REFRIGERATOR CONTROL
Filed Feb. 25, 1946
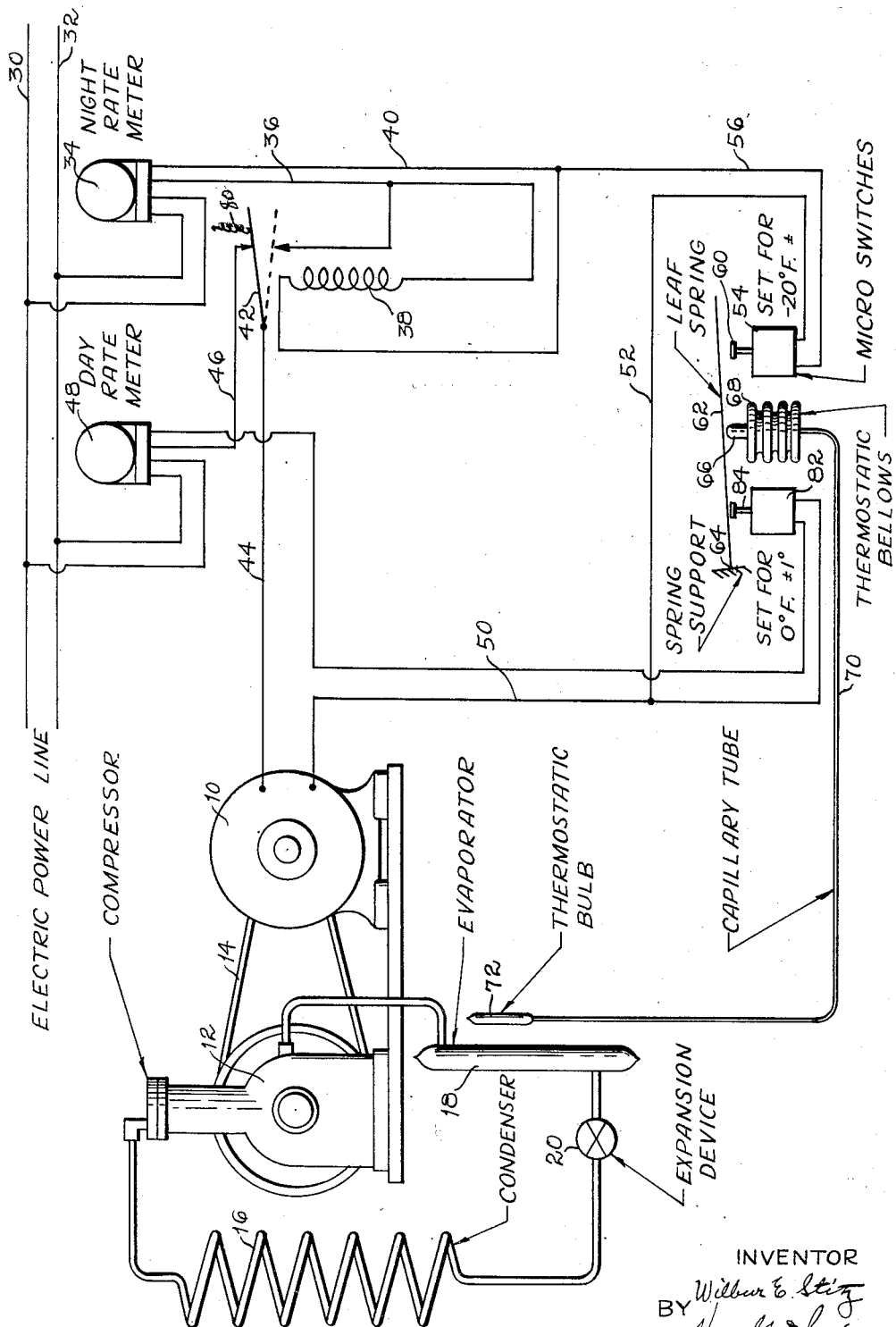
INVENTOR
Wilbur E. Stitz
BY
Henry G. Dilwig
His ATTORNEY Patented Mar. 13, 1951

2,545,054

UNITED STATES PATENT OFFICE 2,545,054

REFRIGERATOR CONTROL

Wilbur E. Stitz, Dayton, Ohio

Application February 25, 1946, Serial No. 650,056

2 Claims. (Cl. 236—46)

This invention relates to control mechanism and more particularly to control mechanism for shifting or transferring the load from one circuit to another.

Power companies generating and selling electric power have encountered considerable difficulty in meeting the demand for power during the peak load periods of the day and at the same time have found it difficult to operate efficiently during the off-peak load periods.

That being the case, a serious attempt is being made to transfer some of the peak load to the off-peak load period, to thereby increase the efficiency of the equipment. As an inducement, power companies offer reduced rates on equipment using electric power during the off-peak period. For example, in many homes, especially in the rural sections, electric hot water heaters are used that heat the water during the night when the demand for electric power is at a low ebb. In order to supply the power to the water heaters at a reduced rate, the hot water heaters are connected into the electric circuit automatically during the off-peak load period and the power used is read on a separate meter, which may be referred to as a night rate meter.

When it comes to other equipment, it might be feasible to use the night rate providing some safety device is used to have current available under predetermined conditions supplied through the regular day rate meter. For example, home freeze units are now being produced for storage of frozen foods, such as meats and vegetables. Due to the low temperature required, such units consume a considerable amount of power.

An object of this invention is to provide a control system for utilizing the off-peak load period rate, oftentimes referred to as the night rate, for operating equipment, which control system connects the equipment to the day rate meter as a precautionary measure to take care of emergencies.

Another object of this invention is to provide a control mechanism that connects equipment through the night rate meter for normal operation responding to predetermined conditions, which control mechanism shifts the load to the day rate meter, which mechanism is energized in response to predetermined conditions differing from the conditions under which the equipment is energized when connected to the night rate meter.

Another object of this invention is to provide a control mechanism for connecting power consuming equipment to the night meter during the off-peak load period and automatically shifting the power consuming equipment to the day meter after the off-peak load period has expired, which control mechanism includes temperature responsive means responding to one temperature to energize the power consuming equipment during the off-peak load period and responding to another temperature for energizing the power consuming equipment when connected to the day rate meter.

Other objects and advantages reside in the construction of parts, the combination thereof and the mode of operation, as will become more apparent from the following description.

In the drawings, the single figure discloses a schematic circuit diagram of an embodiment of the system.

Referring to the drawings, the reference character 10 indicates an electric motor connected into an electrical circuit that will be described more fully in connection with the control mechanism. The motor 10 drives a compressor 12 through a suitable belt 14. The compressor 12 may be any conventional compressor and is associated with the condenser coils 16 and the evaporator 18. A suitable expansion device 20 is connected into the refrigerant circuit.

The refrigerating device has been shown merely for the purpose of illustration, as the control mechanism is not necessarily confined to the refrigeration system, in that the control mechanism is applicable to any other mechanism, especially mechanism having a heat transfer unit, whether the heat transfer unit absorbs heat, as in the case of an evaporator, or the heat transfer unit gives off heat, as in the case of an electric hot water heater.

As stated above, the public utilities selling electricity offer favorable rates during the off-peak load periods, so as to equalize the load on the electric generating plants. Farmers and others are now using refrigerating cabinets for storage of meat, vegetables, fruits, et cetera. In the conventional refrigerating units used for maintaining a low temperature, the compressor is driven by an electric motor whenever the temperature in the cabinet rises above a predetermined temperature level.

The system disclosed herein utilizes the same system in the broad aspect; but is provided with a control mechanism such that during the off-peak load period the compressor reduces the temperature in the cabinet much lower than is absolutely essential in order to keep the goods stored therein frozen. By lowering the temperature in the cabinet, it is not necessary to operate the compressor for a long period of time thereafter.

In the event of an emergency, as for example, failure of electric current during the off-peak load period, or in the event the openings to the cabinet are exposed to the outside air for a sufficient period of time to reduce the temperature in the cabinet, or in the event the cabinet is loaded with unfrozen foods to thereby give off heat so as to raise the temperature in the cabinet, it may be necessary to operate the compressor to reduce the temperature below freezing.

After the off-peak load period has expired, the compressor is connected into the day rate meter circuit, so as to maintain freezing temperature in the cabinet, without reducing the temperature to the temperature required to cut out the compressor when the compressor is connected into the off-peak load period circuit. The circuit and the mechanism for accomplishing these results will now be described.

The electric circuit for energizing the motor is connected to the power lines 30 and 32 through a night rate meter 34, which is standard equipment and incorporates a timing device for closing the circuit through the night rate meter at the off-peak load period and is provided with a mechanism for open-circuiting the night rate meter when the off-peak load period expires. The output of the meter 34 is supplied through a line 36 connected through a magnetic coil 38 having the opposite terminal connected to the line 40, so that when the night rate meter is connected to the lines 30 and 32, the electromagnetic coil 38 is energized. This actuates a switch 42 from the full line position shown in Figure 1, to the dotted position, thereby connecting the line 36 through the switch 42 and the lead 44 to the motor 10. At the same time, the circuit including the lead 46 is opened through the day rate meter 48, which at all other times is connected to the lines 30 and 32.

The other terminal of the motor 10 is connected by the leads 50 and 52 to a switch 54 connected by a lead 56 to the line 40.

The switch 54 is normally closed. It may be opened by pushing a plunger or push button 60 inwardly. The plunger 60 lies in the path of a leaf spring 62 having one end fixedly mounted at 64 and normally biased downwardly against a plunger 66 of the thermostatic bellows 68 connected by a suitable tube 70 to the thermostatic bulb 72 located in the cabinet or within the temperature range of the device to be controlled. As the temperature in the cabinet decreases, the gases or fluids in the thermostatic bulb contract, thereby contracting the thermostatic bellows or Sylphon 68, so as to permit the leaf spring 62 to move downwardly, so as to eventually engage the plunger 60 to open-circuit the motor 10. The switch 54 may be adjusted so as to open-circuit the motor at any desired temperature, as for example, —20° F. By this arrangement the temperature within the cabinet is lower to 20° F. below zero. If the cabinet is well insulated and no emergency arises this may be sufficient to maintain the desired temperature within the cabinet until the following off-peak load period.

When the off-peak load period expires, the circuit to the night rate meter is opened, so as to de-energize the magnetic coil 38, thereby permitting the spring 80 to actuate the switch 42 from the dotted line position in Figure 1 to the full line position, to connect one line of the motor into the day rate meter. During the period that the motor is connected into the day rate meter, a switch 82 that may be set for 0° F., or any other suitable temperature, is connected into the motor circuit. This switch 82 has a plunger or push button 84 that is also actuated by the leaf spring 62. It can be readily seen that the leaf spring 62 open-circuits the motor circuit at a much higher temperature than the switch 54, due to the fact that the push button 84 is mounted in close proximity to the leaf spring 62.

In case of an emergency, or for any other reason the temperature in the cabinet is raised to a critical temperature, the compressor will be driven through the day meter to maintain the proper temperature within the cabinet until the temperature may again be greatly reduced by the off-peak load circuit closed during the off-peak load period.

The control system described herein may be used for actuating other units. For example, it may be used in association with electric hot water heaters. If it were used in connection with electric hot water heaters, the off-peak load period circuit may be used to raise the temperature in the water heater to any desired temperature. If sufficient water is drawn to greatly reduce the temperature, the control mechanism may connect the hot water heater into the day rate circuit, so as to maintain a predetermined minimum temperature level until the off-peak load period again arrives, when the water may be raised to the desired high temperature.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A control mechanism for using a refrigeration system having an off-peak load circuit and a peak load circuit, said off-peak load circuit having an off-peak load rate meter and the peak load circuit having a day rate meter, said off-peak load circuit having means for connecting the off-peak load rate meter into the power lines during predetermined off-peak load periods, the combination including a switch normally biased to close the circuit through the load into the day rate meter, an electromagnetic switch energized in response to the off-peak load rate meter being connected into the power lines for causing said switch to open-circuit the day rate meter and connecting the load into the off-peak load rate meter, first switch means responsive to one predetermined condition for closing the circuit through the load when the load is connected into the day rate meter, and a second switch means for connecting the load to the off-peak load rate meter when another predetermined condition occurs, and a common operator for said first and second switch means responsive to refrigeration requirements.

2. A control mechanism for use in a refrigeration system including a heat exchange unit operable both from an off-peak load circuit and a peak load circuit, said off-peak load circuit having an off-peak load rate meter and the peak load circuit having a day rate meter, said off-peak load rate meter having means for connecting the off-peak load rate meter into the power lines during predetermined off-peak load periods, the combination including a switching mechanism normally biased so as to make the day rate meter circuit available to energize the heat exchange unit, an electromagnet energized when the off-peak load rate meter is connected into the power lines, said electromagnet actuating the switching mechanism to open-circuit the circuit to the day rate meter and to make the off-peak load rate meter available to the circuit including the heat exchange unit, a pair of control switches and a single temperature responsive means for operating said control switches at different temperatures for closing the circuit through the heat exchange unit in response to one temperature when the heat exchange unit is energized from the day rate meter and for connecting the heat exchange unit into the off-peak load rate meter at another temperature.

WILBUR E. STITZ.

REFERENCES CITED

The following references are of record in the file of this patent:

UNITED STATES PATENTS

| Number | Name | Date |
|---|---|---|
| 1,985,215 | Shivers | Dec. 18, 1934 |
| 2,044,482 | Muffly | June 16, 1936 |
| 2,320,265 | Clerc | May 25, 1943 |
| 2,428,312 | Herbener | Sept. 30, 1947 |